United States Patent [19]

Hager

[11] 4,382,436
[45] May 10, 1983

[54] SOLAR WINDOW

[76] Inventor: I. Vincent Hager, P.O. Box 5845, Hilton Head Island, S.C. 29928

[21] Appl. No.: 247,011

[22] Filed: Mar. 24, 1981

[51] Int. Cl.³ .............................................. F24J 3/02
[52] U.S. Cl. .................................. 126/429; 126/419; 126/432; 160/241
[58] Field of Search .............. 126/419, 422, 429, 432, 126/DIG. 1, 452; 160/107, 241

[56] References Cited

U.S. PATENT DOCUMENTS

| 3,107,052 | 10/1963 | Garrison. | |
|---|---|---|---|
| 3,251,407 | 5/1966 | Crosthwait, Jr. | |
| 3,981,445 | 9/1976 | Custer | 126/422 |
| 3,990,635 | 11/1976 | Restle et al. | 160/107 |
| 4,112,918 | 9/1978 | Palkes | 126/422 |
| 4,159,707 | 7/1979 | Miquel | 126/429 |
| 4,181,118 | 1/1980 | Mummert | 126/429 |
| 4,237,865 | 12/1980 | Lorenz | 126/429 |
| 4,301,787 | 11/1981 | Rice | 126/901 |

FOREIGN PATENT DOCUMENTS

| 1379026 | 10/1964 | France. | |
|---|---|---|---|
| 2442412 | 6/1980 | France | 160/107 |
| 574545 | 3/1958 | Italy | 160/107 |
| 2008646 | 6/1979 | United Kingdom. | |

OTHER PUBLICATIONS

Popular Science Monthly, Mar. 1981, vol. 218, No. 3, p. 14.
Solar Houses, 48 Energy-Saving Designs, A House & Garden Book by Louis Gropp, 1978; pp. 14, 24.
The Owner-Built Home, by Ken Kern, 1972; pp. 42, 43.

Primary Examiner—Carroll B. Dority, Jr.
Attorney, Agent, or Firm—Cushman, Darby & Cushman

[57] ABSTRACT

The solar gain through a window assembly is maximized in cold weather, and minimized in warm weather. The window includes first and second transparent sheets with an open volume between the sheets. A selective light reflecting device is disposed in the open volume, allowing passage of light from one sheet to the other in cold weather, but preventing passage in warm weather. A vent in a first frame, mounting the first sheet, selectively allows the passage of air from the exterior of a building containing the window assembly to the volume between the reflecting device and the first sheet, the air being circulated and then passed back to the exterior of the building. Another vent, in a second frame mounting the second sheet, allows circulation of air from the interior of the building, between the transparent sheets, and back to the building interior.

2 Claims, 5 Drawing Figures

SOLAR WINDOW

BACKGROUND AND SUMMARY OF THE INVENTION

In the design of many buildings which are to rely on solar energy for space heating in the winter time, especially passive solar heating systems, large areas of glass are provided on the southern exposure of the building. These large areas of glass allow large solar gain during the winter time, the light passing through the glass and heating objects within the building.

While passive solar heating systems as described above can be very effective during the winter, in many parts of the country they are extremely disadvantageous during summer months. In many areas, cooling loads in the summer are almost as large as heating loads in the winter, and attempts to properly shade the large souther exposure (or northern exposure in the southern hemisphere) windows utilizing overhangs and the like are not entirely effective. If reflective glass is used, the incident light is reflected onto surrounding buildings and objects providing undesirable heat gain therefor in the summer.

According to the present invention, there is provided a method and means for obtaining a large solar gain through a window assembly during the winter time, when such gain is desired, while at the same time effectively minimizing solar gain through the window assembly in warm weather. Thus, appropriate heating needs can be met in the winter time utilizing large window areas, while the window areas do not excessively increase cooling loads in the summer, and without experiencing the disadvantages associated with reflective glass.

According to one aspect in the present invention, a method and apparatus are provided for obtaining large winter gain through a window assembly of a building in cold weather, while minimizing solar gain through the window assembly in the warm weather. The window assembly includes first and second spaced transparent sheets defining a volume therebetween, and defining an exterior surface of the building with exterior air on the opposite side of the first sheet as the second sheet, and with the building interior air on the opposite side of the second sheet as the first sheet. Only in warm weather, when solar gain is not desired, exterior light incident upon the window assembly is caused to be reflected toward the building exterior and prevented from substantially passing into the building interior; and air is circulated from the building exterior between the transparent sheets and exhausted, after circulation, to the exterior of the building. Only in cold weather, when solar gain is desired, the exterior light incident upon the window assembly is allowed to pass through the transparent sheets into the building, and air may be circulated from the building interior between the sheets and exhausted, after circulation, into the interior of the building. A light reflecting device for effecting the selective reflection or passage of incident solar radiation preferably comprises a selective light reflecting device—such as a horizontal slat venetian blind assembly or a rolled sheet with portions of differing transparency—disposed between the first and second transparent sheets. When this device reflects incident radiation, the interior or exterior air is circulated between the reflecting device and the first transparent sheet before being exhausted.

According to another aspect of the present invention, a closure assembly in general is provided for a building exterior surface. The closure includes a first frame member with a first transparent solid sheet supported by the first frame member, and a second frame member with a second transparent solid sheet supported by the second frame member. Means are provided for spacing the first and second frame members and corresponding transparent sheets so that the sheets are substantially parallel and define an open volume therebetween. Light reflecting means, mounted in the open volume, are provided for selectively allowing the passage of light from the first transparent sheet to the second sheet, or preventing the passage of light from the first sheet to the second sheet (reflecting the light back toward the first transparent sheet). First vent means are provided for selectively allowing or preventing passage of air from exteriorily of the first frame member to a volume between the reflecting means and the first frame member, and second vent means are provided for allowing passage of air from within the volume between the reflecting means and the first frame member to a remote area. Further, third vent means are preferably provided for selectively allowing or preventing passage of air from exteriorily of the second frame member to a volume between the reflecting means and the first frame member, and fourth vent means for allowing the passage of air within the volume between the reflecting means and the first frame member to a remote area.

The second and fourth vent means may comprise a common conduit leading from the open volume; first and second branch conduits; and valve means for directing air flow in the common conduit to either the first or second branch conduits. The first and third vent means are preferably disposed in bottom portions of the first and second frame members, respectively, while the second and fourth vent means open into the open volume adjacent to the top portions of the first and second frame members. An exhaust fan may be disposed in the first branch conduit, which can lead from a common conduit to an area outside of the first sheet as the second sheet, and the second branch conduit can open into a building interior adjacent a ceiling fan which evenly distributes the circulated air.

The entire assembly, including vents, valves, reflecting means, etc., can be motorized and automatically controlled, and/or manual control means may be provided on the opposite side of the second sheet as the first sheet for effecting control.

It is the primary object of the present invention to provide an apparatus and method for obtaining large solar gain through a transparent closure assembly in cold weather, while minimizing solar gain through the closure assembly in warm weather. This and other objects of the invention will become clear from inspection and the detailed description of the invention, and from the appended claims.

DETAILED DESCRIPTION OF THE DRAWINGS

Figure 1:
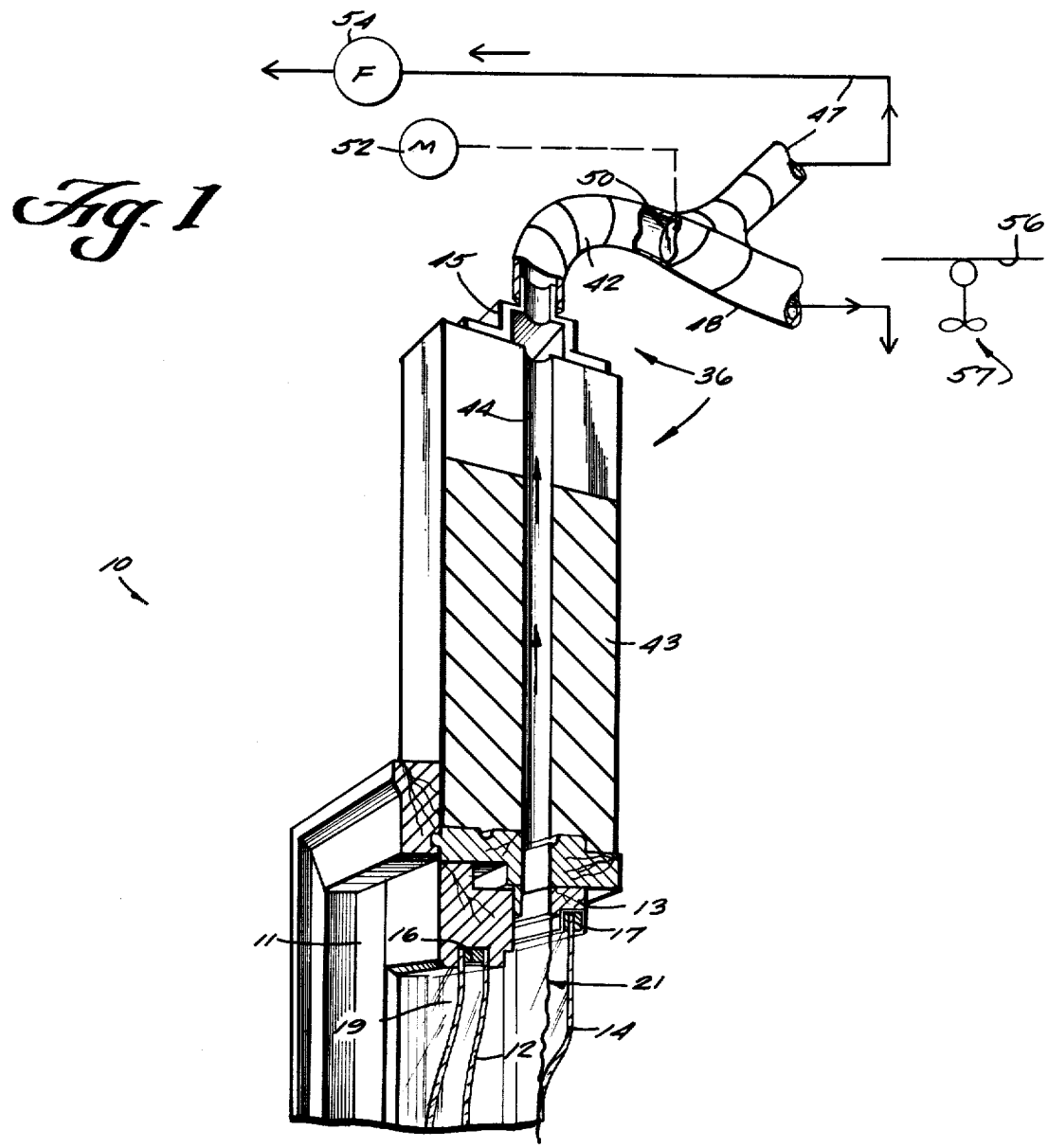
FIG. 1 is a perspective view, partly in cross section and partly in elevation, of an exemplary closure assembly according to the present invention.
Figure 1:
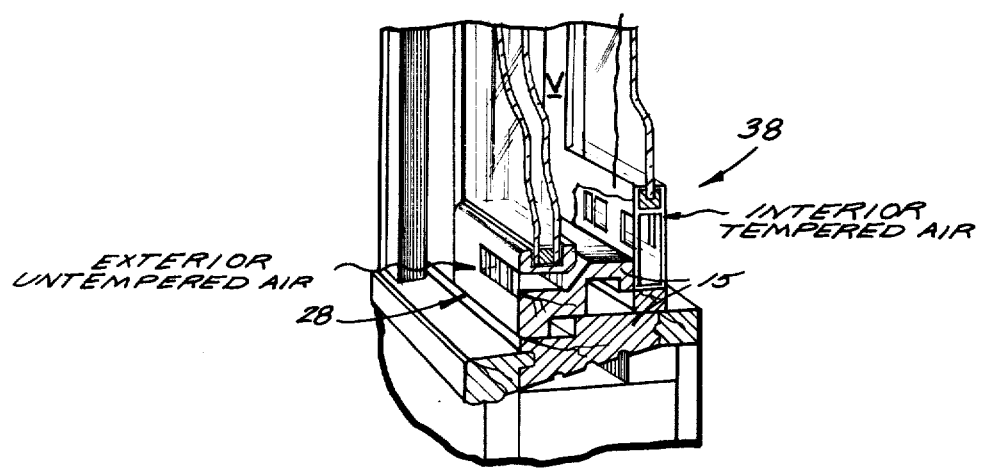

According to the present invention, a closure assembly, typically a window assembly, for a building exterior surface is provided, illustrated generally at 10 in FIG. 1. The assembly typically comprises a first frame member 11 supporting a first transparent solid sheet 12, and a second frame member 13 supporting a second transparent solid sheet 14. Means are provided, such as the sill structure 15, for spacing the frame members 11, 13 and corresponding transparent sheets 12, 14 so that the sheets 12, 14 are essentially parallel and define an open volume V therebetween. The frame members 11, 13 may be of wood, aluminum, or any other suitable window or closure frame material, and the sheets 12, 14 may be glass, plastic, or any other suitable transparent material. Preferably, conventional sealing structures illustrated generally at 16 and 17 of FIG. 1, are provided for sealing the sheets 12, 14 to the frame members 11, 13 respectively. The frame members 11, 13 may comprise conventional fixed or movable window installations. Further, a third transparent sheet 19 may be mounted in the first frame member 11 in sealed relationship, and spaced from, the first transparent sheet 12, and the second transparent sheet 14 may likewise have another corresponding transparent sheet associated therewith.

The first frame member 11 is normally disposed so that it defines the exterior of a building, while the second frame member 13 defines the interior wall of a building. Light reflecting means are provided for selectively allowing the passage of light from the first transparent sheet 12 to the second transparent sheet 14, or preventing the passage of light from sheet 12 to sheet 14 (reflecting the light back toward the first sheet 12). This light reflecting means preferably comprises a structure, illustrated only schematically at 21 in FIG. 1 for clarity of illustration, disposed between the first and second sheets 12, 14.

Figure 2A:
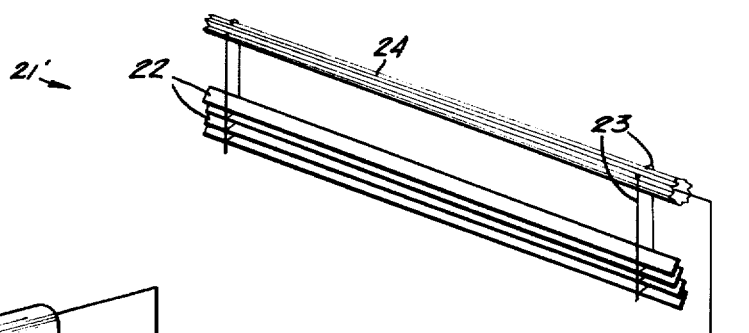
FIGS. 2a and 2b are schematic perspective views of portions of an exemplary selective reflecting means utilizable in the assembly of FIG. 1.

A wide variety of selective light reflecting structures may be utilized within the volume V, and one such means is illustrated schematically at 21 in FIG. 2a as a conventional horizontal slat venetian blind assembly. Each of the slats 22 are pivotal from an overlapping position (illustrated in FIG. 2) to a spaced position, allowing light transmission therethrough when in the spaced position and reflecting the light incident thereon when in the overlapped position. Conventional control strings 23 may be provided, the strings 23 operatively connected to a rotatable control rod 24, the taking-up or letting-out of the strings 23 on the control rod 24 controlling the pivotal motion of the slats 22. If desired, a motorized device 25 may be provided for effecting rotation of the rod 24. A manual control 26 may be provided for the motor 25, the control 26 located on the opposite side of the sheet 14 as the sheet 12 (i.e., within the building interior).

Figure 2B:
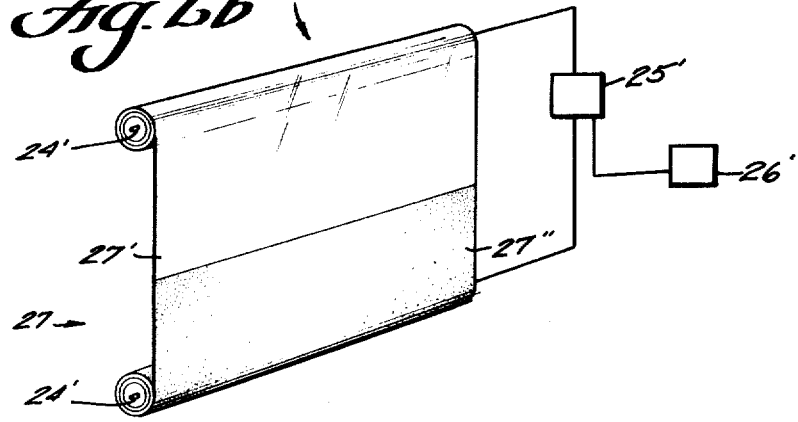

A preferred form of the selective reflecting means is illustrated schematically at 21" in FIG. 2b. This comprises a pair of rollers 24' with a sheet of material 27 fastened at the ends thereof to the rollers 24', and rolled-up on the rollers. The rollers 24' preferably are rotatable about horizontal axes, and are spaced apart a distance corresponding to the height of the volume V. The sheet 27 is about the same width as the volume V (at least the width of the sheets 12, 14). The sheet 27 has a plurality of portions thereof which vary in transparency, and each of the portions is as long as the distance between the rollers 24'. For instance, a portion 27' is clear, and allows passage of all light incident thereon into the building with which window assembly 10 is associated. Portion 27" is completely opaque, and does not allow passage of any light therethrough. Any number of portions of the sheet 27 may be provided, each portion having a different opacity or transparency than the others. Any suitable material or materials may be utilized to form the sheet 27—for instance it may be of plastic. If desired, a motorized device 25' may be provided for effecting rotation of the rollers 24', with a manual control 26' therefor located within the building interior. In some environments the rollers 24' are rotatable about vertical axes.

The means 21, 21' are preferably positioned in operative association with the second frame member 13, and do not block vent 38 (while covering sheet 14).

Figure 3:
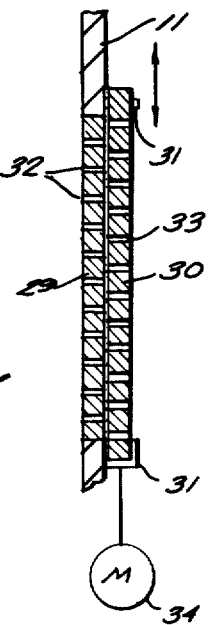
FIG. 3 is a top schematic cross sectional view of the exemplary vent means utilized in the assembly of FIG. 1.

The window assembly 10 further comprises first vent means, illustrated schematically at 28 in FIGS. 1 and 3, for selectively allowing or preventing passage of air from exteriorily of the frame 11 to the open volume V, and specifically through a portion of the volume V between the light reflecting means 21 and the transparent sheet 12. The vent means is preferably disposed in a bottom portion of the frame 11, as illustrated in FIG. 1, and may comprise—as illustrated in FIG. 3—a pair or relatively movable apertured plates 29, 30. For instance, plate 29 may be integral with the bottom portion of the frame member 11, while plate 30 is mounted interiorily thereof, parallel thereto, and guided for relative slidable movement by guides 31. In the closed position of the vent means (illustrated in FIG. 3) the apertures 32 of plate 29 are not in alignment with the apertures 33 of plate 30, while in the open position of the vent means the plate 30 is moved so that the apertures 32, 33 are aligned. If desired, a powered mechanism 34 may be provided for effecting relative movement of the plate 30 with respect to plate 29.

The window assembly 10 further comprises second vent means for allowing passage of air from within the volume V, and particularly the portion thereof, between the reflecting means 21 and the sheet 12, to an area remote from the assembly 10. Such a second vent means is illustrated generally and schematically by reference numeral 36 in FIG. 1.

The assembly 10 also preferably comprises third and fourth vent means for circulating interior building air through the volume V during the winter time. Such circulation permits immediate use of heat entering the structure in the winter without the necessity for waiting for heat storage material located within building interior to warm up and radiate heat. The third vent means are illustrated generally by reference numeral 38 in FIG. 1, and selectively allow or prevent passage of air from the interior of the building through the second frame member 13 into the volume V. The third vent means 38 may also comprise a pair of relatively slidable parallel apertured plates, like these of the first vent means 28 illustrated in FIG. 3. A powered structure 40

(see FIG. 4) may also be provided for controlling the opening and closing of the third vent means 38.

In the embodiment illustrated in FIG. 1, the fourth vent means and the second vent means 36 comprise many common components, such as a common conduit (ducting) 42, a solid member 43 extending upwardly from the tops of the frame members 11, 13 and having means defining a plurality of passageways 44 therein, and a header 45 disposed at the top of the solid component 43. All of the passageways 44 lead from volume V to the header 45, a common connection being provided for the common conduit 42 to the header 45. The second and fourth vent means also includes first and second branch conduits 47, 48; and valve means 50 for directing air flow in the common conduit 42 to either the first branch conduit 47 or the second branch conduit 48, or closing off the conduit 42 entirely. A powered device 52 may be provided for controlling movement of valve means 50 from one position thereof to the other. Alternatively, the fourth and second vent means may open directly from the top of the frames, and may be controlled manually.

The first branch conduit 47 opens to the exterior of the building (that side of the sheets 12 opposite the sheet 14), as schematically illustrated in FIG. 1, and to facilitate air movement in the branch conduit 47 an exhaust fan 54 may be disposed therein. The second branch conduit 48 preferably opens up to the building interior (i.e., the opposite side of sheet 14 as sheet 12), such as adjacent a building ceiling 56 as illustrated schematically in FIG. 2. To facilitate even distribution of the air exhausting from second branch conduit 48, a ceiling mounted fan 57 may be provided adjacent to the opening of the second branch conduit 48 into the building interior. Of course the conduit 48 could be connected directly to the heating system of the building.

Figure 4:
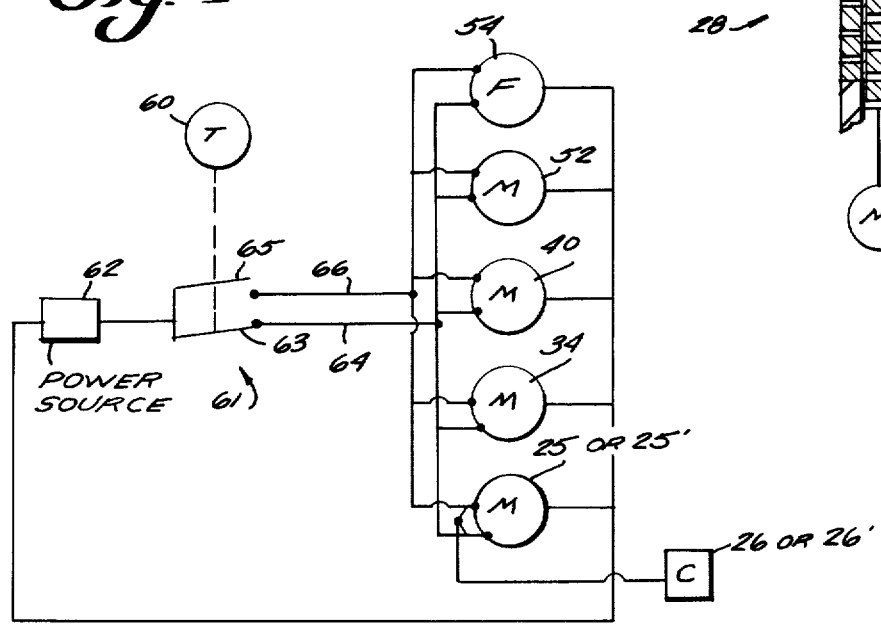
FIG. 4 is a schematic circuit diagram illustrating an exemplary manner of automatic or manual control of powered components associated with the window assembly of FIG. 1.

FIG. 4 schematically illustrates a manner in which all of the powered devices 25, 34, 40, 52, 54 may be automatically controlled depending upon environmental temperature conditions. As illustrated in FIG. 4, a temperature responsive member 60 may be provided for controlling a relay 61 disposed in a circuit with a source 62 of electrical current. When relay contact 63 is closed, power from source 62 passes through electrical wire 64 to effect one mode of control of the powered devices 25, 34, 40, 52, 54. When movable contact 65 is closed, current from power source 62 passes through the electrical wire 66 to provide an opposite mode of control of the powered devices 25, 34, 40, 52, 54. In addition to, or in place of, the temperature sensitive device 60, a manual control, such as the control 26, may be provided for each of the powered devices 25, 34, 40, 52, 54.

Exemplary apparatus according to the invention having been described, and exemplary method of utilization thereof for obtaining large solar gain for a building in cold weather, while minimizing solar gain in the warm weather, will be set forth:

Only in warm weather, when solar gain is not desired, motor 25 controlling reflecting means 21' is operated to effect overlap of the slats 22. Exterior light incident upon the window assembly 10 will then be reflected toward the building exterior, and substantial passage thereof into the building interior will be prevented. Additionally, first vent 28 will be open, third vent 38 will be closed, and valve 50 will be actuated so that exterior air passes through vent 28, between sheet 12 and light reflecting means 21, up passageways 44, through branch conduit 47, and back to the building exterior. Operation of fan 54 facilitates this.

Only in cold weather, when solar gain is desired, the light reflecting means 21' are operated so that the horizontal slats 22 are spaced from each other, allowing exterior light incident upon the window assembly 10 to pass through the sheets 12, 14 into the building interior. The third vent 38 may be open, first vent 28 closed, and the valve 50 operated so that interior air passes through vent 38, up passageways 44, and through second branch conduit 48 back into the building interior. Ceiling fan 57 may be operated to properly distribute the air exhausted from second branch conduit 48 into the building interior.

It will thus be seen that in the summer the interior of the building is shaded, the heated air between the sheet 12 and the light reflecting device 21 is continuously exhausted from the window assembly 10 to keep its temperature as low as feasible, and thus solar gain is minimized. However, in the winter, solar gain is maximized since light passes freely through the transparent sheets. Immediate use of the heat between the sheets 12, 14 may be made by slightly closing reflective means 21 and circulating interior air through the volume V, to be heated, and back into the building interior.

It is further noted that natural ventilation can be achieved by opening the bottom interior vent and upper exterior vent on the south side of the building and opening the interior and exterior vents on the north side of the building. Heating of air on the south side windows will cause the natural upward flow of air within the window unit, pulling interior air out of the building. That interior air would be replaced by cooler air from the shaded north side of the building or from underground cooling ducts on the north side of the building.

While the invention has been herein shown and described in what is presently conceived to be the most practical and preferred embodiment, it will be apparent to those of ordinary skill in the art that many modifications may be made within the scope of the invention. For instance, in the summertime instead of exhausting the air in first branch conduit 47 back to the exterior of the building, it can be run through a heat exchanger for heating water for domestic use. Many other modifications are also possible, thus, it is intended that the invention be accorded the broadest interpretation of the appended claims so as to encompass all equivalent apparatus and methods.

What is claimed is:

1. A closure assembly for a building exterior surface, comprising:
   a first frame member;
   a first transparent solid sheet supported by said first frame member;
   a second frame member;
   a second transparent solid sheet supported by said second frame meber;
   means for spacing said first and second frame members and corresponding transparent sheets so that said sheets are substantially parallel and define an open volume therebetween;
   means mounted in said open volume for selectively allowing the passage of light from said first transparent sheet to said second sheet, or preventing the passage of light from said first transparent sheet to said second transparent sheet, said means comprising a pair of spaced rollers, and a sheet rolled up on said rollers, said sheet having transparent portions having substantially the same length and height as said volume between said transparent sheets and varying in transparency, and a distinct opaque portion having substantially the same length and height as said volume;

first vent means for selectively allowing or preventing passage of air from exteriorly of said first frame member to a volume between said reflecting means and said first frame member; and second vent means for allowing passage of air from within the volume between said reflecting means and said first frame member to a remote area.

2. An assembly as recited in claim 1 wherein said first and second frame members are vertically disposed window frame components, and further comprising a sill structure interconnecting said frame members.

* * * * *